Patented May 14, 1935

2,000,934

UNITED STATES PATENT OFFICE 2,000,934

TREATMENT OF CELLULOSE ESTERS

Camille Dreyfus, New York, N. Y., and Leslie N. Lee, Cumberland, Md., assignors to Celanese Corporation of America, a corporation of Delaware No Drawing. Application February 26, 1929, Serial No. 342,932

10 Claims. (Cl. 260—102)

This invention relates to the treatment of organic esters of cellulose, and relates more particularly to subjecting such cellulose esters to a treatment whereby their resistance to heat is materially increased.

An object of our invention is to treat organic esters of cellulose by treating with certain acid solutions whereby at least some of the impurities that tend to impair their resistance to heat is removed.

In the formation of organic esters of cellulose, cellulose is treated with an esterifying agent in the presence of a catalyst that promotes esterification. The catalysts most commonly used are sulfur compounds and particularly sulfuric acid. After the esterification, some of the sulfur compounds used as catalysts enter into reaction with the cellulose to form sulpho-compounds of cellulose, and these sulpho-compounds greatly diminish the resistance of the cellulose esters to the action of heat. We have found that if the esters of cellulose are treated with suitable concentrations of solutions of certain acids at suitable temperatures, a large percentage of the sulfur compounds are removed, and the heat test of the cellulose esters materially increased.

In accordance with our invention we treat organic esters of cellulose at any suitable stage after their formation with aqueous solutions of certain oxygen containing acids of suitable concentration and at elevated temperatures. By this method the heat resistance of the cellulose esters is materially increased.

Any suitable organic ester of cellulose such as cellulose acetate, cellulose formate, cellulose propionate and cellulose butyrate, may be treated in accordance with our invention, when such esters of cellulose have been prepared in the presence of a sulfur containing catalyst such as sulfuric acid. These esters of cellulose may be treated at any stage of their treatment after their formation; that is, they may be treated prior to ripening to desired solubility, if such treatment is carried out, or they may be treated at any time subsequent thereto.

The oxygen containing acids that we prefer to employ are oxalic acid, phosphoric acid, nitric acid or any suitable mixture of these acids, although other acids may also be employed. These acids may also be employed in admixture with a quantity of sulfuric acid. As to the concentration of the acids employed in the aqueous treating bath, they may be varied within wide limits, ranging from 0.5 to 20% or more, depending on the nature of the acid and the temperature employed. Thus in the case of phosphoric acid or oxalic acid, if the solution of the same is applied at boiling temperatures, 3 to 8% concentration will be found suitable.

The ester of cellulose to be treated in accordance with our invention may be made in any desired manner, and as previously stated may be treated by our process in any stage of its treatment. Thus a cellulose acetate may be treated by our invention, which cellulose acetate is formed by the treatment of a suitable cellulosic material with acetic anhydride and a catalyst in the presence of a solvent such as glacial acetic acid so that the cellulose acetate that is formed becomes dissolved in the acetylating mixture. After completion of the acetylation, the cellulose acetate may be ripened by the addition of a suitable amount of water or any other suitable agent until it reaches the stage of solubility in organic solvents that is desired, whereupon the cellulose acetate may be precipitated by the addition of a large amount of water or other precipitating agent. This cellulose acetate may then be treated by our process, or it may be first washed and ground and then treated by our process.

If desired, the organic ester of cellulose may be formed by esterifying the same in the presence of diluents that are not solvents for the ester of cellulose so that the organic ester of cellulose does not dissolve in the acetylating mixture. Thus cellulose acetate may be formed by treating cotton or other cellulosic material with acetic anhydride and a catalyst in the presence of a diluent such as benzol. After the mechanical removal of the cellulose acetate from the acetylating mixture, the same may be treated by our process either before or after washing with water.

As an example of the advantages of our process, it is pointed out that a cellulose acetate having a heat test of 180° C. and a $SO_4$ content of 0.45% before being treated by our stabilizing process has a heat test of 215° C. to 250° C. or more and a $SO_4$ content of 0.10 to 0.02% or less. The term heat test indicates the temperatures at which the cellulose acetate first chars or assumes a dark color.

In order further to illustrate our invention but without being limited thereto, the following specific examples are given.

Example 1

A cellulose acetate prepared by treatment of cotton with acetic anhydride and sulfuric acid as catalyst in the presence of a diluent may be treated by our invention. This cellulose acetate may be formed by the treatment of 50 parts of cotton linters with an acetylating mixture comprising 190 parts of acetic anhydride, 210 parts of acetic acid, 750 parts of benzol and 2.5 parts of sulfuric acid. These parts are by weight. The acetylation is carried out at temperatures from 11° C. to 50° C. for about 24 hours. The cellulose acetate thus formed is separated from the acetylating liquors by extraction in a centrifugal basket and is then washed free from the acid and benzol. The cellulose acetate thus formed has a heat test of 189° to 192° C. and a $SO_4$ content of 0.44%.

The cellulose acetate thus produced is boiled for 6 hours in an aqueous solution containing 5% of oxalic acid. This cellulose acetate now has a heat test of 244° to 247° C. and a $SO_4$ content of 0.04%.

*Example II*

The cellulose acetate described in Example I is boiled for 7 hours in an aqueous solution containing 5% of phosphoric acid. The product thus formed has a heat test of 223° to 225° and a $SO_4$ content of 0.05%.

*Example III*

The cellulose acetate described in Example I is boiled for 7 hours in an aqueous solution containing 5% of phosphoric acid and 1% of nitric acid for 7 hours. The cellulose acetate now has a heat test of 238 to 241° C. and a $SO_4$ value of 0.02%.

Having described our invention, what we claim and desire to secure by Letters Patent is:

1. Method of preparing an organic ester of cellulose of high resistance to heat comprising esterifying cellulose in an esterifying bath containing sufficient non-solvent for the cellulose ester to be formed so that the same does not enter into solution, mechanically separating the cellulose ester formed, and treating the same while in solid form with a solution of an oxygen-containing acid having a dissociation constant greater than $1.0 \times 10^{-2}$, at a temperature substantially that of the boiling point of the solution.

2. Method of preparing cellulose acetate of high resistance to heat comprising acetylating cellulose in an acetylation bath containing sufficient non-solvent for the cellulose acetate to be formed so that the same does not enter into solution, mechanically separating the cellulose acetate, and treating the same while in solid form with a solution of an oxygen-containing acid having a dissociation constant greater than $1.0 \times 10^{-2}$ at a temperature substantially that of the boiling point of the solution.

3. Method of preparing cellulose acetate of high resistance to heat comprising acetylating cellulose in an acetylation bath containing sufficient non-solvent for the cellulose acetate to be formed so that the same does not enter into solution, mechanically separating the cellulose acetate and treating the same while in solid form with a solution of nitric acid at a temperature substantially that of the boiling point of the solution.

4. Method of preparing cellulose acetate of high resistance to heat comprising acetylating cellulose in the presence of a sulfur-containing catalyst in an acetylation bath containing sufficient non-solvent for the cellulose acetate to be formed so that the same does not enter into solution, mechanically separating the cellulose acetate and treating the same while in solid form with an aqueous nitric acid of 0.5 to 20% concentration at a temperature substantially that of the boiling point of the solution.

5. Method of preparing cellulose acetate of high resistance to heat comprising acetylating cellulose in an acetylation bath containing sufficient non-solvent for the cellulose acetate to be formed so that the same does not enter into solution, mechanically separating the cellulose acetate and treating the same while in solid form with a solution of phosphoric acid at a temperature substantially that of the boiling point of the solution.

6. Method of preparing cellulose acetate of high resistance to heat comprising acetylating cellulose in the presence of a sulfur-containing catalyst in an acetylation bath containing sufficient non-solvent for the cellulose acetate to be formed so that the same does not enter into solution, mechanically separating the cellulose acetate and treating the same while in solid form with an aqueous phosphoric acid of 3 to 8% concentration at a temperature substantially that of the boiling point of the solution.

7. Method of preparing cellulose acetate of high resistance to heat comprising acetylating cellulose in an acetylation bath containing sufficient non-solvent for the cellulose acetate to be formed so that the same does not enter into solution, mechanically separating the cellulose acetate and treating the same while in solid form with a solution of oxalic acid at a temperature substantially that of the boiling point of the solution.

8. Method of preparing cellulose acetate of high resistance to heat comprising acetylating cellulose in the presence of a sulfur-containing catalyst in an acetylation bath containing sufficient non-solvent for the cellulose acetate to be formed so that the same does not enter into solution, mechanically separating the cellulose acetate and treating the same while in solid form with aqueous oxalic acid of 3 to 8% concentration at a temperature substantially that of the boiling point of the solution.

9. Method of preparing an organic ester of cellulose of high resistance to heat, which comprises esterifying cellulose in an esterifying bath containing sufficient non-solvent for the cellulose ester to be formed so that the same does not enter into solution, mechanically separating the cellulose ester formed, and treating the same while in solid form with a solution of an oxygen-containing acid, having a dissociation constant greater than $1.0 \times 10^{-2}$, of 0.5–20% concentration at a temperature substantially that of the boiling point of the solution.

10. Method of preparing an organic ester of cellulose of high resistance to heat, which comprises esterifying cellulose in an esterifying bath containing sufficient non-solvent for the cellulose ester to be formed so that the same does not enter into solution, mechanically separating the cellulose ester formed, and treating the same while in solid form with a solution of an oxygen-containing acid, having a dissociation constant greater than $1.0 \times 10^{-2}$, of 3–8% concentration at a temperature substantially that of the boiling point of the solution.

CAMILLE DREYFUS.
LESLIE N. LEE.